United States Patent
Funae et al.

(10) Patent No.: US 8,509,684 B2
(45) Date of Patent: Aug. 13, 2013

(54) MICROWAVE FREQUENCY CONVERTER (75) Inventors: Akio Funae, Nishinomiya (JP); Koji Dai, Nishinomiya (JP); Hideki Torizuka, Kawasaki (JP)

(73) Assignee: Furuno Electric Company Limited, Nishinomiya (JP)

( * ) Notice: Subject to any disclaimer, the term of this patent is extended or adjusted under 35 U.S.C. 154(b) by 775 days.

(21) Appl. No.: 10/584,414

(22) PCT Filed: Dec. 20, 2004

(86) PCT No.: PCT/JP2004/019497
§ 371 (c)(1),
(2), (4) Date: Feb. 2, 2007

(87) PCT Pub. No.: WO2005/067156
PCT Pub. Date: Jul. 21, 2005

(65) Prior Publication Data
US 2007/0210954 A1   Sep. 13, 2007

(30) Foreign Application Priority Data

Dec. 26, 2003 (JP) ................................. 2003-434888

(51) Int. Cl.
*H04B 7/14* (2006.01)
(52) U.S. Cl.
USPC .......................................................... 455/20
(58) Field of Classification Search
USPC .......................................................... 455/20
See application file for complete search history.

(56) References Cited

U.S. PATENT DOCUMENTS

| | | | | |
|---|---|---|---|---|
| 5,006,812 A * | 4/1991 | Erickson | ............................ | 330/2 |
| 5,554,954 A * | 9/1996 | Takahashi | ...................... | 327/546 |
| 5,583,837 A * | 12/1996 | Ogino et al. | ............... | 369/44.36 |
| 5,732,329 A * | 3/1998 | Miyazaki | ......................... | 455/76 |
| 5,809,090 A * | 9/1998 | Buternowsky et al. | ........ | 375/347 |
| 5,995,819 A * | 11/1999 | Yamaji et al. | .................. | 455/326 |
| 6,035,008 A * | 3/2000 | Kim | ............................... | 375/345 |
| 6,104,241 A * | 8/2000 | Cova et al. | ..................... | 330/149 |
| 6,226,504 B1 * | 5/2001 | Takagi | ........................ | 455/234.1 |

(Continued)

FOREIGN PATENT DOCUMENTS

| | | |
|---|---|---|
| JP | 1-112486 U | 7/1989 |
| JP | 3-239979 A | 10/1991 |

(Continued)

*Primary Examiner* — Bobbak Safaipour
(74) *Attorney, Agent, or Firm* — Birch, Stewart, Kolasch & Birch, LLP (57) ABSTRACT

A microwave frequency converter for a radar receiver is provided in which a frequency of a local oscillator of the microwave frequency converter can be prevented from interfering with an oscillation frequency of a magnetron included in the radar receiver and which can receive a signal from a considerably short distance. A voltage of an RF amplifier connected to the microwave frequency converter is synchronized with an oscillation output of the magnetron. The gate and drain voltages of a FET used in the RF amplifier are simultaneously switched OFF only during times before and after the magnetron performs oscillation, thereby switching an amplification function of the FET to an attenuation function thereof to increase a switching loss of the microwave frequency converter. Thereby, an excessively large power RF signal directly input from the magnetron and an excessively large power RF signal reflected from a short distance are attenuated to prevent the microwave frequency converter from being saturated, and the frequency of the local oscillator from interfering with the oscillation frequency of the magnetron.

6 Claims, 9 Drawing Sheets

(56) References Cited

U.S. PATENT DOCUMENTS

| | | | |
|---|---|---|---|
| 6,229,370 B1* | 5/2001 | Inamori et al. | 327/308 |
| 6,351,504 B1* | 2/2002 | Igarashi et al. | 375/349 |
| 6,625,238 B2* | 9/2003 | Wieck | 375/349 |
| 6,771,942 B2* | 8/2004 | Matsumoto | 455/131 |
| 6,794,942 B2* | 9/2004 | Smith | 330/264 |
| 7,003,275 B1* | 2/2006 | Petrovic | 455/323 |
| 7,215,278 B2* | 5/2007 | Bandhauer | 342/82 |
| 7,502,600 B2* | 3/2009 | Kazakevich et al. | 455/126 |
| 2002/0098803 A1* | 7/2002 | Poulton et al. | 455/13.1 |
| 2002/0158689 A1* | 10/2002 | Harris et al. | 330/129 |
| 2003/0117218 A1* | 6/2003 | Tichauer | 330/284 |
| 2004/0087287 A1* | 5/2004 | Abe | 455/136 |
| 2004/0214533 A1* | 10/2004 | Khorram | 455/118 |
| 2004/0214545 A1* | 10/2004 | Kushima et al. | 455/232.1 |
| 2005/0010958 A1* | 1/2005 | Rakib et al. | 725/111 |
| 2005/0176388 A1* | 8/2005 | Yamawaki et al. | 455/126 |
| 2006/0146398 A1* | 7/2006 | Aozasa et al. | 359/341.1 |

FOREIGN PATENT DOCUMENTS

| | | |
|---|---|---|
| JP | 5-180928 A | 7/1993 |
| JP | 5-188136 A | 7/1993 |
| JP | 6-281724 A | 10/1994 |
| JP | 9-127239 A | 5/1997 |
| JP | 2001-111447 A | 4/2001 |
| JP | 2003-107147 A | 4/2003 |

* cited by examiner

MICROWAVE FREQUENCY CONVERTER

TECHNICAL FIELD

The present invention relates to a microwave frequency converter for use in a radar apparatus.

BACKGROUND ART

Figure 6:
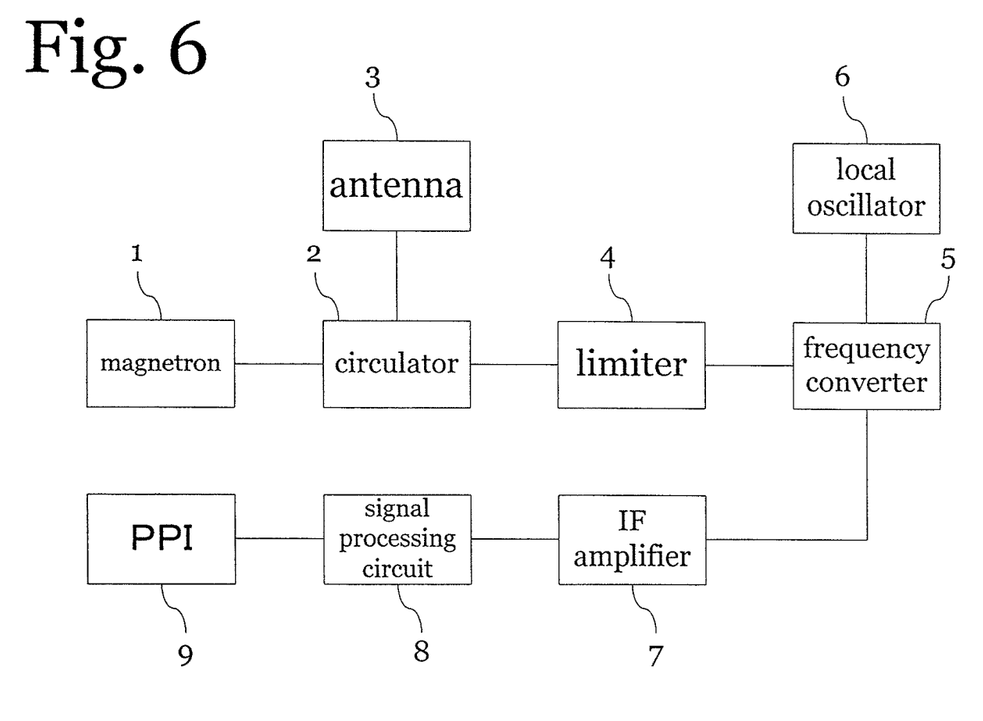
FIG. 6 is a block circuit diagram illustrating a configuration of a conventional pulse radar.

A general configuration of a pulse radar is illustrated in FIG. 6. In the pulse radar, a magnetron 1 outputs a pulse signal having an oscillation frequency of, for example, 9.41 GHz (e.g., a pulse width of 1 μs, an output of 10 kW), the pulse signal is emitted into the air from an antenna 3 via a circulator 2, a signal reflected from an object is received by the antenna 3 again, and the signal is input to a limiter 4. The signal which is input via the limiter 4 to a frequency converter 5 is mixed with an output (local oscillation signal of, for example, 9.47 GHz) of a local oscillator 6, to be converted into an intermediate frequency (IF signal) of, for example, 60 MHz. The converted IF signal is amplified by an IF amplifier 7, is converted into a video signal by a signal processing circuit 8, and an image is displayed on a radar display device (PPI). Note that the limiter 4 is provided so as to prevent a large signal from being input to break the frequency converter 5. In recent years, a microwave integrated circuit (MIC) is used to integrate the limiter 4 with the frequency converter 5.

Figure 7:
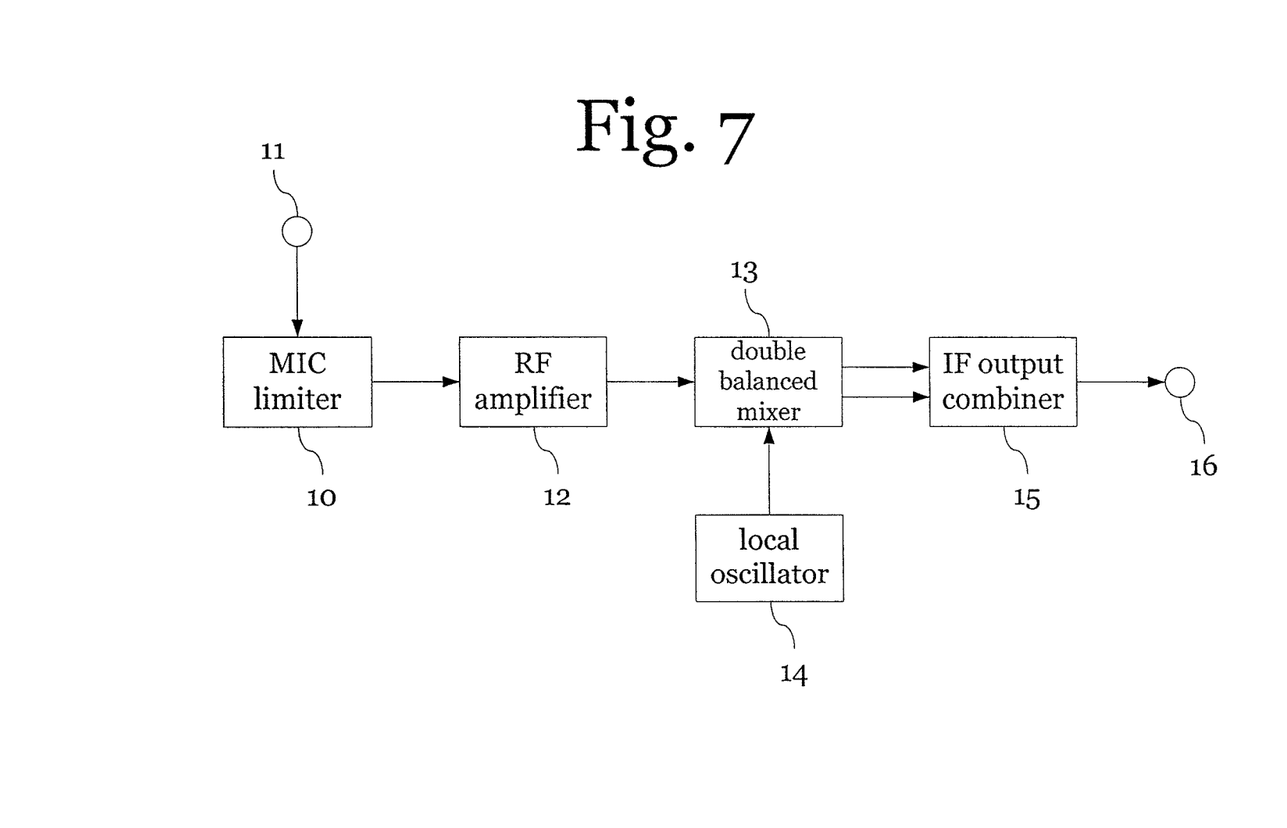
FIG. 7 is a block diagram illustrating a circuit configuration of a conventional microwave frequency converter.

A conventional circuit configuration of a microwave frequency converter for use in a pulse radar as illustrated in FIG. 6, is illustrated in FIG. 7. In the conventional microwave frequency converter, a pulse-modulated microwave signal (RF signal) input through an input terminal 11 of an MIC limiter 10 is amplified by an RF amplifier 12, the resultant signal is input to a double balanced mixer 13 to be mixed with a signal (local oscillation signal) of a local oscillator 14, two IF outputs are combined by an IF output combiner 15, and the combined output is obtained at an IF output terminal 16 (see Patent Document 1).

Patent Document 1: JP 2001-111447 A

Figure 8:
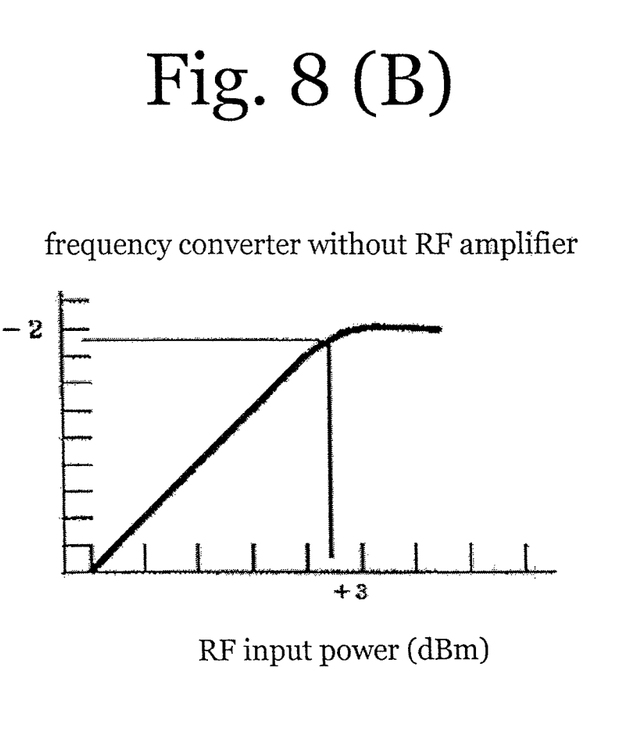
FIG. 8(A) is a graph illustrating input-output characteristics of a conventional microwave frequency converter with RF amplifier.
FIG. 8(B) is a graph illustrating input-output characteristics of a conventional microwave frequency converter without RF amplifier.

The radar pulse signal emitted from the antenna is received as a smaller signal as an object reflecting the signal is more distant, and is received as a larger signal as an object reflecting the signal is nearer, or is received as a smaller signal as an object reflecting the signal is smaller, and is received as a larger signal as an object reflecting the signal is larger. The above-described conventional microwave frequency converter has the following drawbacks. FIG. 8(A) illustrates an IF output power with respect to an RF input power of a frequency converter with RF amplifier. FIG. 8(B) illustrates an IF output power with respect to an RF input power of a frequency converter without RF amplifier. Specifically, the frequency converter with RF amplifier of FIG. 8(A) amplifies a signal using the RF amplifier, and therefore, is suitable for detection of a distant or small reflective object. However, as illustrated in FIG. 8(A), saturation starts when the RF signal is at a level of, for example, −5 dBm, so that a signal of −5 dBm or more which is reflected from a near or large reflective object cannot be detected due to saturation. In other words, a signal from a short distance cannot be received.

In contrast to this, the frequency converter without RF amplifier can detect an input of up to +3 dBm without saturation as illustrated in FIG. 8(B).

Note that the frequency converter without RF amplifier is not suitable for detection of a distant or small reflective object, since the frequency converter without RF amplifier does not amplify a signal.

In recent years, however, to avoid collision between ships or between a ship and a fixed object is becoming the main purpose of radars, and performance capable of detecting a nearer reflective object than the status quo is desired. Performance of detecting a distant or small reflective object, which is conventionally possessed by radars, is indispensable. In other words, a radar capable of receiving a signal within a range of a long distance to a short distance (shorter than that of conventional products) is becoming desired.

In the pulse radar, the magnetron 1 outputs a pulse signal having an oscillation frequency of, for example, 9.41 GHz (e.g., a pulse width of 1 μs, an output of 10 kW), so that an excessively large power which leaks directly to the limiter 4, though the circulator 2 is provided therebetween, is input to the frequency converter 5.

Due to the excessively large power, the oscillation frequency of the local oscillator 6 used in the frequency converter 5 is changed. Therefore, an intermediate frequency (IF signal) of, for example, 60 MHz is changed. When the intermediate frequency (IF signal) is changed, the amplification degree of an intermediate frequency amplifier is changed, and in an extreme case, the reception sensitivity is reduced. Therefore, it is desired that the oscillation frequency of the local oscillator 6 be not changed.

Figure 9:
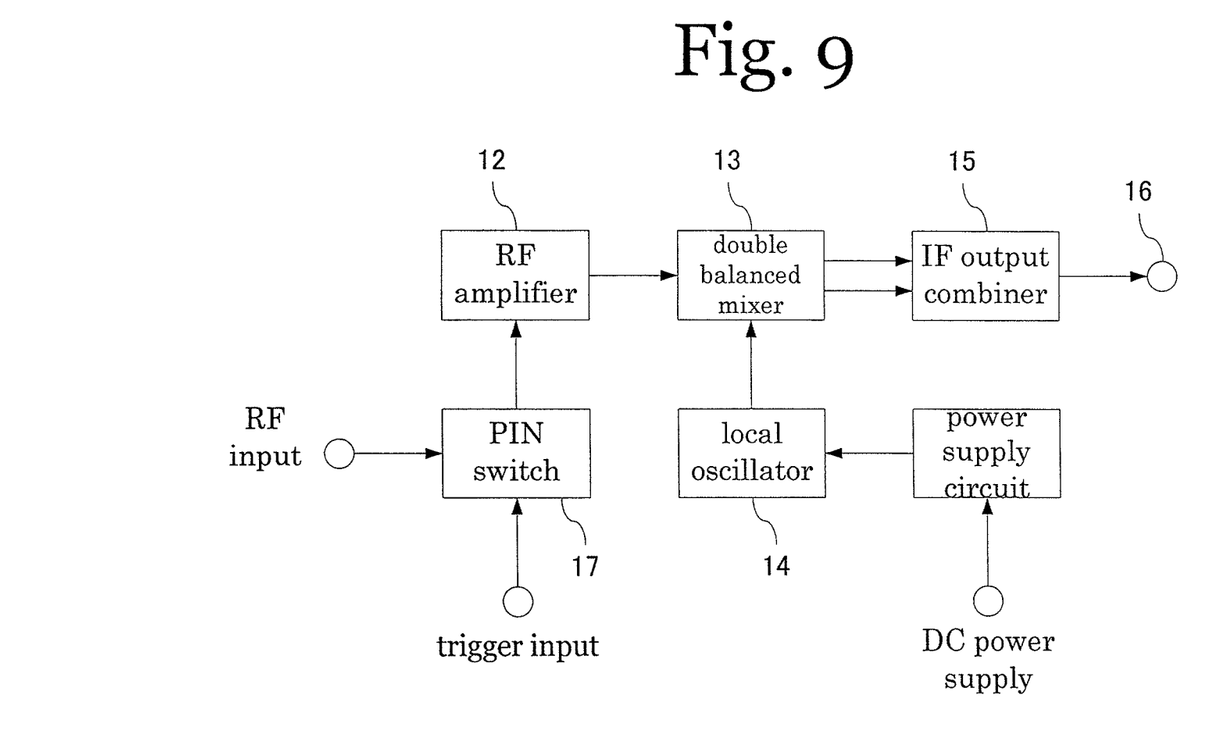
FIG. 9 a block diagram illustrating a configuration of a conventional microwave frequency converter.

FIG. 9 illustrates a conventional microwave frequency converter which have both characteristics of FIGS. 8(A) and (B).

Specifically, in the conventional microwave frequency converter, a PIN switch 17 is provided before the RF amplifier 12. The PIN switch 17 switches ON/OFF an RF input based on a trigger input.

Before an excessively large RF signal directly input from the magnetron of the pulse radar is applied to the RF amplifier 12, the PIN switch 17 is switched ON with a trigger input. The ON state is held until the end of the input of the excessively large reflected signal from a short distance to the RF amplifier 12. When the RF signal input to the RF amplifier 12 becomes less than or equal to a saturated input of the RF amplifier 12, the PIN switch 17 is switched OFF, thereby returning to the ordinary microwave frequency converter.

However, even when the PIN switch 17 is in the OFF state, an insertion loss of about 1 dB remains. Therefore, the microwave frequency converter with the PIN switch 17 is not suitable for detection of a distant or small reflective object, compared to the conventional microwave frequency converter without the PIN switch 17. Also, the PIN switch 17 composed of a single stage of PIN diode has an attenuation amount of about 15 dB, and the attenuation amount is insufficient for an excessively large reflected signal from a considerably short distance. When two stages of PIN diodes are provided so as to increase the attenuation amount, the residual insertion loss disadvantageously increases.

To solve the above-described conventional problems, the present invention provides a microwave frequency converter which has the same performance as that of conventional microwave frequency converters with RF amplifier and can receive a reflection from a distant or small object, and can receive a signal from a considerably shorter distance than when a PIN switch is switched ON/OFF, and in which the oscillation frequency of the local oscillator 6 is not changed due to a direct power from the magnetron 1.

DISCLOSURE OF INVENTION

According to claim 1 of the present invention, to achieve the object, a microwave frequency converter comprises an RF amplifier capable of changing a gain to any value within a range from an amplified state to an attenuated state, and a control circuit for applying a gain control voltage to the RF amplifier. The control circuit controls the gain control voltage to be applied to the RF amplifier so as to cause the gain of the RF amplifier to be in the attenuated state during a period of time including a time during which a transmission section performs oscillation and times therebefore and thereafter, and to be in the amplified state during any period of time other than the period of time.

According to claim 2 of the present invention, to achieve the object, in the microwave frequency converter, the control circuit continuously changes the gain control voltage to continuously change the gain of the RF amplifier from a predetermined gain value in the amplified state to a predetermined gain value in the attenuated state, or from a predetermined gain value in the attenuated state to a predetermined gain value in the amplified state.

According to claim 3 of the present invention, to achieve the object, in the microwave frequency converter, the control circuit instantaneously changes the gain control voltage to instantaneously change the gain of the RF amplifier from a predetermined gain value in the amplified state to a predetermined gain value in the attenuated state, or from a predetermined gain value in the attenuated state to a predetermined gain value in the amplified state.

According to claim 4 of the present invention, to achieve the object, in the microwave frequency converter, the RF amplifier employs a FET device or a HEMT device which is operated by applying a negative voltage to a gate thereof and a positive voltage to a drain thereof, and the control circuit simultaneously switches ON/OFF a gate voltage and a drain voltage to be applied to the gate and the drain of the device to cause the gain of the RF amplifier to be in the attenuated state when the gate voltage and the drain voltage are switched ON, and to be in the amplified state when the gate voltage and the drain voltage are switched OFF.

With the above-described configurations, it is possible to provide a microwave frequency converter which can receive a reflection from a distant or small object with the same function as that of conventional microwave frequency converters with RF amplifier, and receive a signal from a considerably short distance, and in which the oscillation frequency of the local oscillator is not changed due to a power directly input from the magnetron.

The microwave frequency converter of the present invention can receive a signal reflected from a shorter distance, compared to conventional microwave frequency converters without saturation, and therefore, can recognize a target object located at a considerably short distance, which is a considerably important function for prevention of collision between ships or between a ship and a fixed object or the like, this function being a main purpose of radars for ships in recent years.

DESCRIPTION OF THE INVENTION

Hereinafter, embodiments of the present invention will be described with reference to the accompanying drawings.

Figure 1:
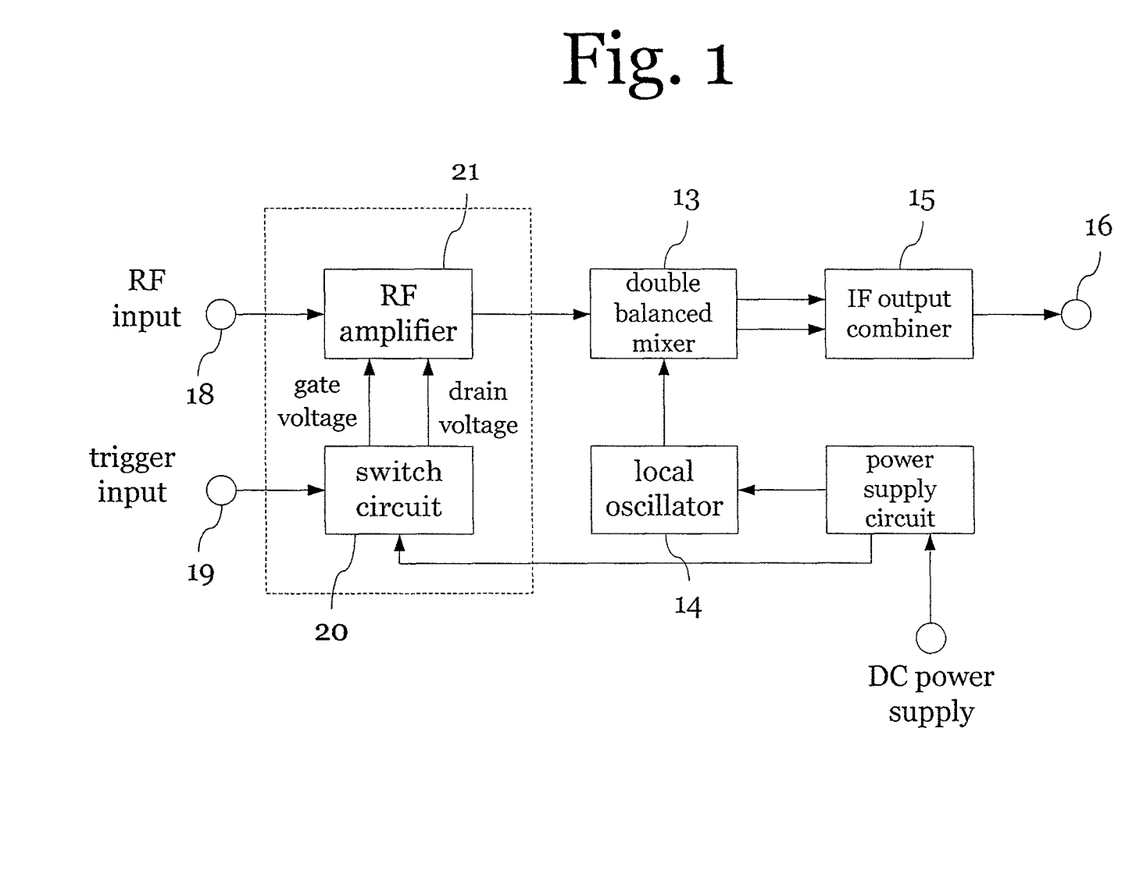
FIG. 1 is a block circuit diagram illustrating a circuit configuration of a microwave frequency converter according to an embodiment of the present invention.

FIG. 1 is a circuit configuration diagram of a microwave frequency converter according to the present invention. The microwave frequency converter of this embodiment is configured to require an externally input trigger voltage which is in synchronization with a magnetron output and includes a time during which a magnetron outputs, and when the trigger voltage is input to a control circuit 20, control a gain control voltage, depending on the input.

19 indicates an input terminal through which the trigger voltage is input, and 20 indicates control circuit which is operated according to a trigger signal input through the trigger input terminal 19 to control a gain control voltage supplied from a power supply circuit 21 indicates an RF amplifier which amplifies a pulse-modulated microwave signal (RF signal), and the power supply is controlled by the control circuit 20. 14 indicates a local oscillator which is driven by the power supply circuit to oscillate a local oscillation signal. 13 indicates a double balanced mixer which mixes the local oscillation signal and the microwave signal (RF signal) amplified by the RF amplifier 12. The two IF outputs thus mixed and output are combined by an IF output combiner 15, and the resultant combined output is obtained at an IF output terminal 16.

A principle of operation of this embodiment will be described with reference to FIG. 1. The microwave frequency converter of this embodiment is illustrated, except for an MIC limiter. A trigger (pulse) voltage is applied to the trigger input terminal 19 immediately before a pulse-modulated microwave signal (RF signal) is input directly from a magnetron to an input terminal 18. The control circuit 20 is operated using a trigger voltage to simultaneously set gain control voltages (i.e., a gate voltage and a drain voltage) supplied from a power supply circuit to be 0 V, thereby interrupting the voltage of the RF amplifier 21. Thereby, a FET used in the RF amplifier 21 has the same characteristics as those obtained when a type of resistance attenuator is connected before a mixer 13. Specifically, the FET exhibits input-output characteristics which are attenuated by ten and several dB from the input-output characteristics of FIG. 8(B) obtained when an attenuators is connected before the frequency converter without RF amplifier of FIG. 8(B).

Although a time during which a bias to the FET is zero for one trigger varies among radars, the bias is held at zero for several microseconds to several tens of microseconds after the end of an RF signal, and thereafter, returns to a normal voltage.

Figure 2:
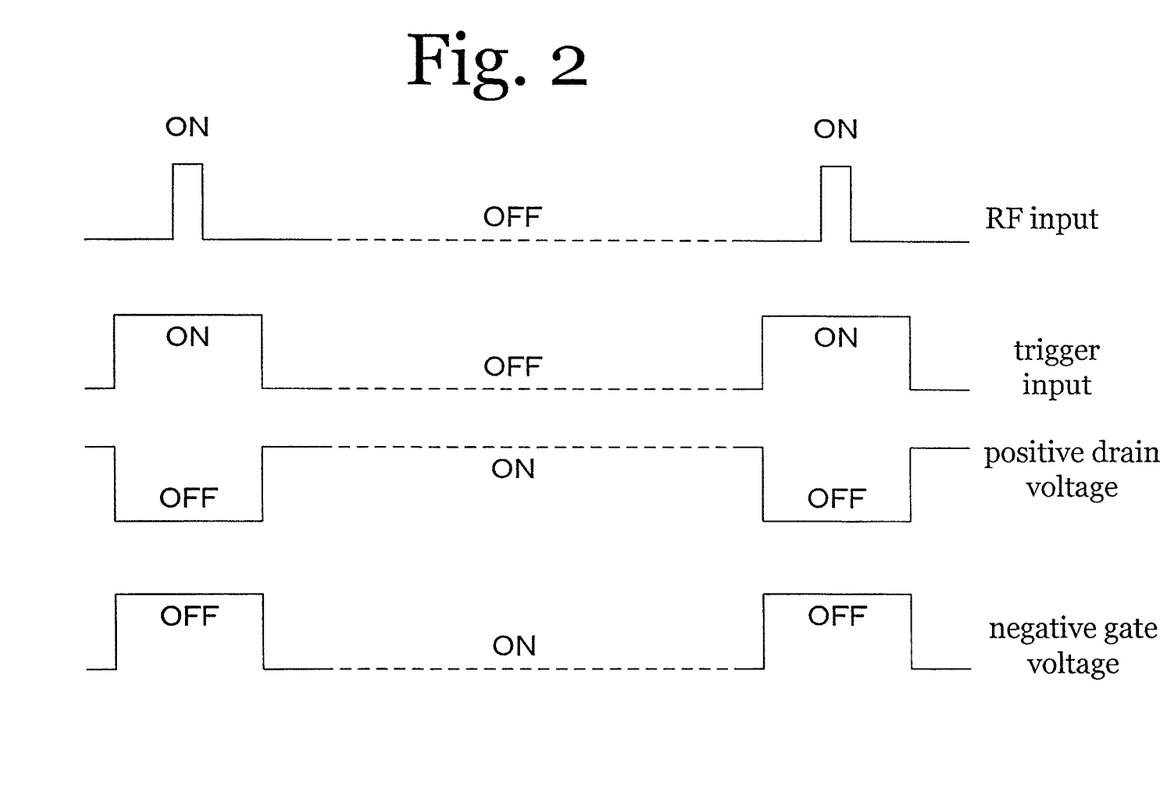
FIG. 2 is a timing chart of the microwave frequency converter of the present invention.

FIG. 2 illustrates a timing chart of the microwave frequency converter of the present invention. Note that drain and gate voltages of FIG. 2 correspond to the above-described gain control voltages.

By applying a trigger input to set the gain control voltages (i.e., the drain and gate voltages) to be 0 V before oscillation of the magnetron, an excessively large RF signal is attenuated by ten and several dB to a small level so that the RF signal does not have an influence on the frequency of the local oscillator, in the microwave frequency converter.

The RF signal is emitted from a radar antenna, and the RF input is finished before the radio wave is reflected from a reflective object. A signal which is reflected and comes back immediately after the RF signal is finished, is one from a considerably short distance. In this case, conventional microwave frequency converters would be saturated. However, the microwave frequency converter of the present invention is in the ON state during that time due to a trigger, and both the gain control voltages (i.e., the gate voltage and the drain voltage) are 0 V during the time when the trigger input is ON, so that the microwave frequency converter is not saturated even for an excessively large reflected signal.

Figure 3:
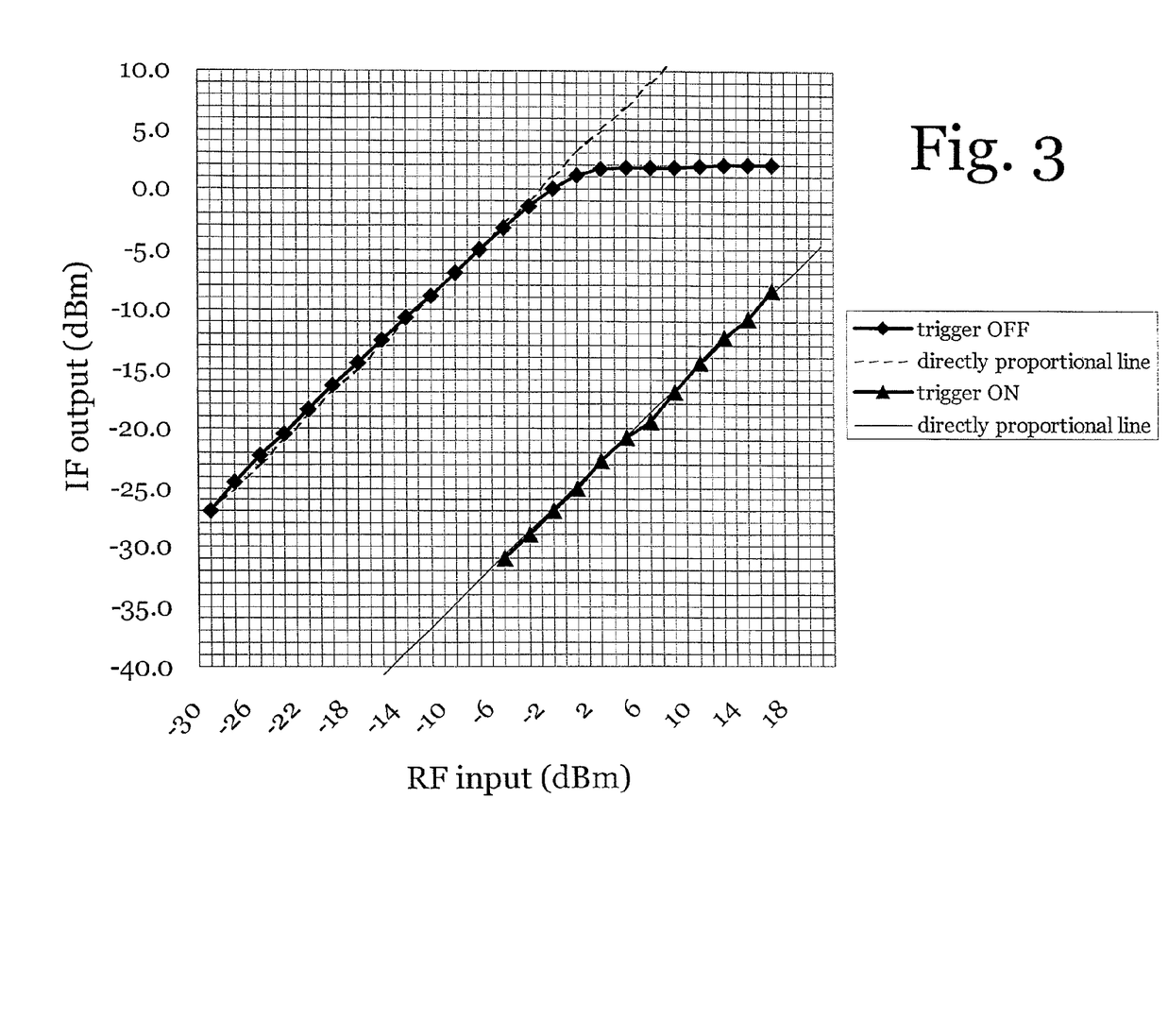
FIG. 3 illustrates a result of an actual measurement of an IF output power with respect to an RF input power when a trigger voltage is switched ON/OFF in the microwave frequency converter of the present invention.

FIG. 3 illustrates a result of an actual measurement of an IF output power with respect to an RF input power when the trigger voltage is switched ON/OFF (the control circuit 20 receiving the trigger input instantaneously changes the gain control voltages) in the microwave frequency converter of the present invention.

As illustrated in FIG. 3, when the trigger is OFF, both the drain and gate voltages are ON, the gain is about +6 dB, and the 1 dB-compressed input power is about −2 dBm. When the trigger is ON, both the drain and gate voltages are OFF, the gain is about −25 dB, and the 1 dB-compressed input power exceeds +20 dBm. The saturation phenomenon when the trigger is OFF is caused by the mixer used in the microwave frequency converter. Therefore, the saturation when the trigger is ON is also caused by the mixer, so that there is not a difference in the saturated value of the IF output between ON and OFF of the trigger, i.e., ON and OFF of the drain and gate voltages.

Therefore, the IF output value when the trigger is ON is not saturated until the IF output value when the trigger is ON becomes equal to the IF output value when the trigger is OFF, thereby making it possible to receive an excessively large reflected signal.

Whereas the amplification degree of the RF amplifier employing a FET is generally about 12 dB with respect to 9.41 GHz, the attenuation amount is about 20 dB when the power supply of the RF amplifier is 0 V. The difference is represented in FIG. 3.

Figure 4:
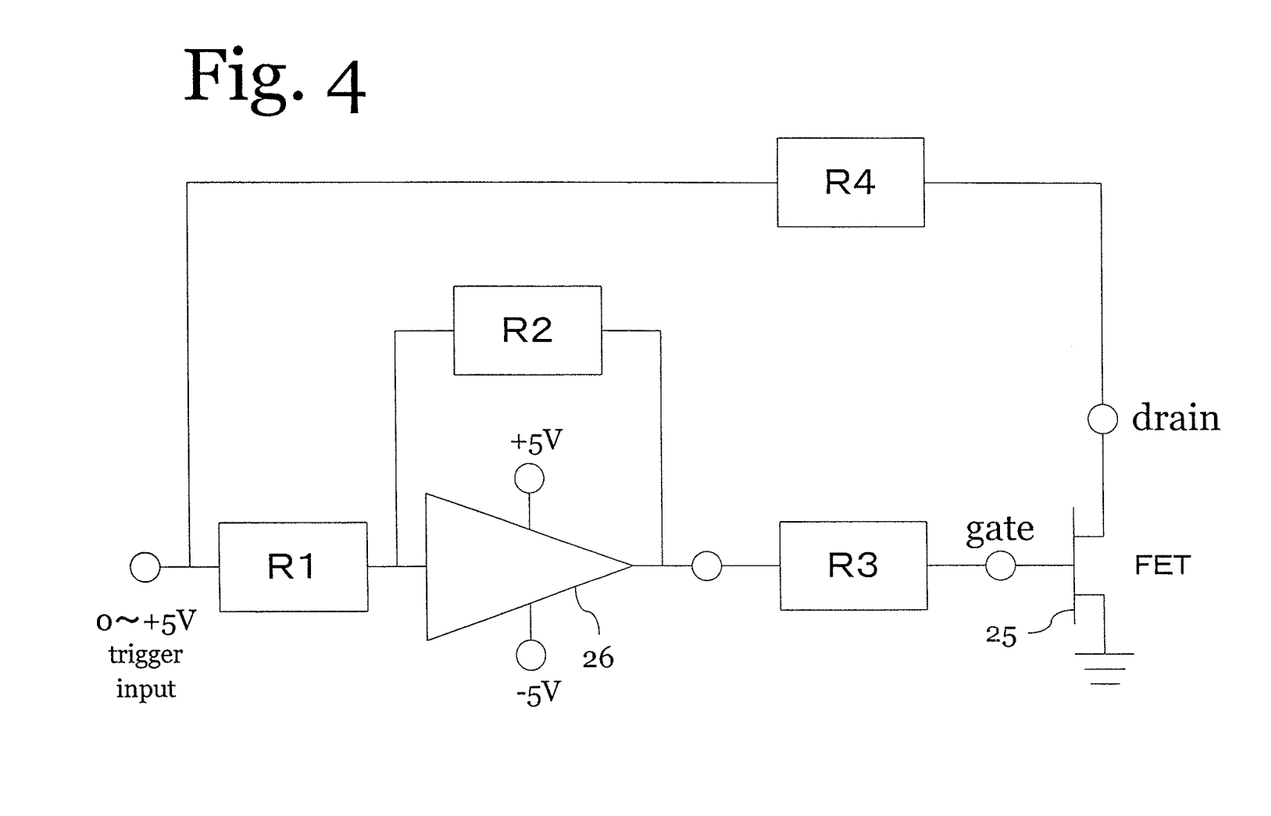
FIG. 4 illustrates an example of a control circuit 20 used in the microwave frequency converter of the present invention.

An example of the control circuit 20 of FIG. 1 is illustrated in FIG. 4.

An operational amplifier 26 is used as a bias control circuit for a FET 25 used in an RF amplifier.

As biases for the operational amplifier 26, +5V and −5V are used. Resistances R1, R2, R3 and R4 are connected to terminals of the operational amplifier 26. The resistance R2 is connected so that, when a trigger input voltage is +5V, a current of about 10 mA flows through the drain of the FET 25.

The gate voltage of the FET 25 at that time is about 0.4 V. This value varies, depending on the performance of the FET 25. Therefore, it is desirable that a drain current be selected so as to minimize the NF (noise factor) of the RF amplifier.

Under these bias conditions, when the trigger input is 0 V, the gain control voltages (i.e., the drain and gate voltages of the FET 25) simultaneously become 0 V, thereby exhibiting the effect of the present invention.

Specifically, when the trigger voltage of FIG. 4 is +5 V, the characteristics of FIG. 3 where the trigger is OFF are exhibited; and when the trigger voltage of FIG. 4 is 0 V, the characteristics of FIG. 3 where the trigger is ON are exhibited. An inverter circuit may be connected before the trigger input so that when the trigger voltage of FIG. 4 is +5 V, the characteristics of FIG. 3 where the trigger is ON are exhibited; and when the trigger voltage of FIG. 4 is 0 V, the characteristics of FIG. 3 where the trigger is OFF are exhibited.

If these conditions are satisfied, the same bias polarity as that of conventional PIN diodes is obtained, so that the compatibility with conventional frequency converters is provided. Therefore, the frequency converter of the present invention can be advantageously used without changing other peripheral circuits.

The control circuit 20 of FIG. 4 is an exemplary circuit used in the frequency converter of the present invention. Other circuit configurations may satisfy the conditions of the present invention.

Note that it has been heretofore described by way of the example that the control circuit 20 instantaneously changes the gain control voltage by switching ON/OFF the trigger voltage of the control circuit 20 of FIG. 4. When the control circuit 20 continuously changes the gain control voltage by gradually changing the trigger voltage, characteristics continuous between when the trigger is ON and the trigger is OFF of FIG. 3 are obtained.

Figure 5:
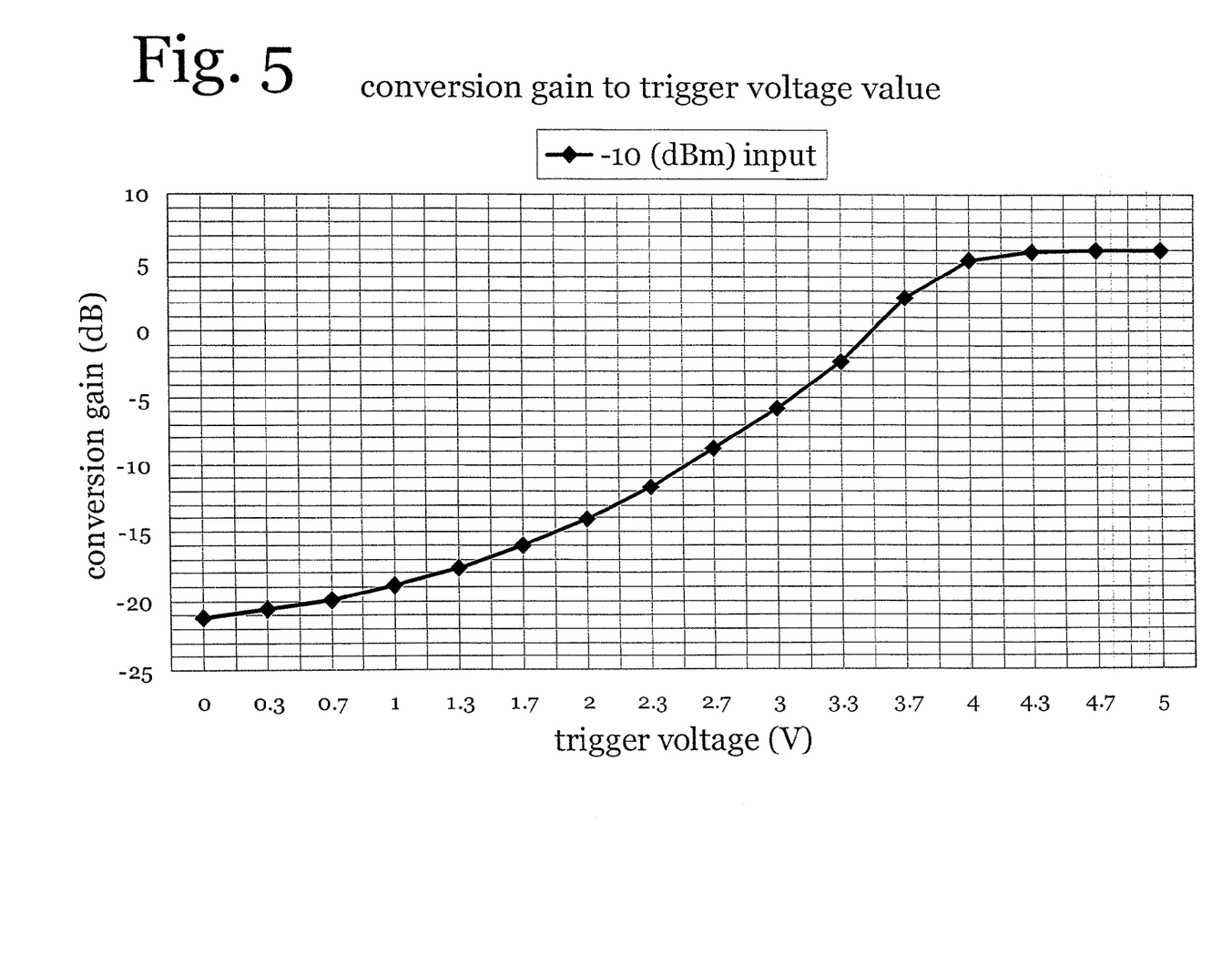
FIG. 5 illustrates actually measured gain values with respect to trigger voltages in the microwave frequency converter of the present invention.

FIG. 5 illustrates actually measured gain values when an RF input power having a constant value of −10 dBm is input to the frequency converter of the present invention, and the trigger voltage of the circuit of FIG. 4 is continuously changed from 0 V to 5 V (the control circuit 20 continuously changes the gain control voltage).

This bias control circuit provides exemplary characteristics when an inverter circuit is connected before the trigger input.

When the trigger voltage is 0 V, the gain is −21 dB. When the trigger voltage is 5 V, the gain is +6 dB. Thus, the dynamic range is 27 dB. Therefore, significantly wider characteristics are obtained, compared to the dynamic range 15 dB of conventional PIN switches.

INDUSTRIAL APPLICABILITY

The present invention can be applied to a microwave frequency converter for use in a radar receiver.

The invention claimed is:

1. A microwave frequency converter comprising:
   an RF amplifier whose gain is adjustable to any value within a range of gain values, the range of gain values including a plurality of gain values associated with an amplified state and a plurality of gain values associated with an attenuated state, said amplified state being a state where the RF amplifier performs amplification and said attenuated state being a state where the RF amplifier performs attenuation;
   and a control circuit that applies a gain control voltage to the RF amplifier;
   wherein the control circuit controls the gain control voltage such that the gain of the RF amplifier is in the attenuated state during a period of time including a time during which a transmission section performs oscillation and times therebefore and thereafter, and to be in the amplified state during any period of time other than the period of time; and further wherein the RF amplifier does not perform attenuation when its gain value is associated with an amplified state.

2. The microwave frequency converter according to claim 1, wherein the control circuit continuously changes the gain control voltage to continuously change the gain of the RF amplifier from a predetermined gain value in the amplified state to a predetermined gain value in the attenuated state, or from a predetermined gain value in the attenuated state to a predetermined gain value in the amplified state.

3. The microwave frequency converter according to claim 1, wherein the control circuit instantaneously changes the gain control voltage to instantaneously change the gain of the RF amplifier from a predetermined gain value in the amplified state to a predetermined gain value in the attenuated state, or from a predetermined gain value in the attenuated state to a predetermined gain value in the amplified state.

4. The microwave frequency converter according to claim 3, wherein the RF amplifier includes a FET device or a HEMT device operated by applying a negative voltage to a gate thereof and a positive voltage to a drain thereof, and the control circuit simultaneously switches ON/OFF the gate and drain voltages such that the gain of the RF amplifier is in the attenuated state when the gate voltage and the drain voltage are switched ON, and in the amplified state when the gate voltage and the drain voltage are switched OFF.

5. A microwave frequency converter comprising:
an RF amplifier whose gain is adjustable to any value within a range of gain values, the range of gain values including a plurality of gain values associated with an amplified state and a plurality of gain values associated with an attenuated state, said amplified state being a state where the RF amplifier performs amplification and said attenuated state being a state where the RF amplifier performs attenuation;
and a control circuit that applies a gain control voltage to the RF amplifier;
wherein the control circuit controls the gain control voltage such that the gain of the RF amplifier is in the attenuated state during a period of time including a time during which a transmission section performs oscillation and times therebefore and thereafter, and to be in the amplified state during any period of time other than the period of time; and
further wherein both the amplified state and attenuated state of the amplifier gain are directly controlled by the gain control voltage.

6. The microwave frequency converter according to claim 5, wherein the RF amplifier is a FET.

* * * * *